(12) United States Patent
Santoso et al.

(10) Patent No.: US 7,483,383 B2
(45) Date of Patent: Jan. 27, 2009

(54) STACK MANAGER PROTOCOL WITH AUTOMATIC SET UP MECHANISM

(75) Inventors: Ignatius Santoso, Thousand Oaks, CA (US); Roberto Henrique Jacob da Silva, Calabasas, CA (US); Timothy Hicks, Newbury Park, CA (US); Vincent Magret, Oak Park, CA (US)

(73) Assignee: Alcatel Lucent, Paris (FR)

( * ) Notice: Subject to any disclaimer, the term of this patent is extended or adjusted under 35 U.S.C. 154(b) by 563 days.

(21) Appl. No.: 11/027,458

(22) Filed: Dec. 29, 2004

(65) Prior Publication Data

US 2006/0092853 A1    May 4, 2006

Related U.S. Application Data

(60) Provisional application No. 60/623,370, filed on Oct. 28, 2004.

(51) Int. Cl.
*H04J 1/16* (2006.01)
(52) U.S. Cl. .................. 370/244; 370/218; 370/252; 370/255
(58) Field of Classification Search .......... 370/400, 370/386, 244
See application file for complete search history.

(56) References Cited

U.S. PATENT DOCUMENTS

| | | | |
|---|---|---|---|
| 5,505,203 A | | 4/1996 | Deitrich et al. |
| 5,737,311 A | * | 4/1998 | Wyld .................. 370/227 |
| 5,805,817 A | * | 9/1998 | Yu et al. .................. 709/224 |
| 6,304,546 B1 | * | 10/2001 | Natarajan et al. .......... 370/216 |
| 6,785,272 B1 | * | 8/2004 | Sugihara ................ 370/386 |
| 7,120,683 B2 | * | 10/2006 | Huang .................... 709/223 |
| 7,123,615 B2 | * | 10/2006 | Weyman et al. ............ 370/389 |
| 7,145,864 B2 | * | 12/2006 | Lee et al. ................. 370/216 |
| 2002/0046271 A1 | | 4/2002 | Huang |
| 2003/0084161 A1 | * | 5/2003 | Watson et al. ............. 709/227 |
| 2005/0198373 A1 | * | 9/2005 | Saunderson et al. ........ 709/238 |
| 2005/0265358 A1 | * | 12/2005 | Mishra et al. ............. 370/400 |
| 2006/0072480 A1 | * | 4/2006 | Deval et al. .............. 370/254 |

FOREIGN PATENT DOCUMENTS

EP    1528730 A    5/2005

* cited by examiner

*Primary Examiner*—Ricky Ngo
*Assistant Examiner*—DeWanda Samuel

(57) ABSTRACT

A stack switch for performing pass-through forwarding operations, assigning stack switch identifiers to a plurality of stack switches, temporarily disabling supervision messages exchanged by stack switches, and electing a primary master stack switch is disclosed. In the pass-through mode, the stack switch automatically forwards packets between stack ports independent of their destination address to maintain connectivity between adjacent stack switches while conventional bridging and routing operations are disabled. The sequential identifiers are also preferably assigned in accordance with the sequential position of the various stack switches to better reflect the topology of those switches. The switch is also preferably adapted to temporarily disable the transmission of supervision messages between stack switches to prevent re-assignment of network management functions when switch resources are low. The switch may execute a stack switch identifier numbering scheme based on the time the switch became operational.

11 Claims, 12 Drawing Sheets

| STACK_ELECTION_MESSAGE 1100 | |
|---|---|
| MESSAGE TYPE 1102 | ELECTION REQUEST OR ELECTION INDICATION |
| ORIGINATOR IDENTIFICATION KEY 1104 | OEID AND MAC ADDRESS OF THE SENDER OF THE MESSAGE. |
| HOP COUNT 1106 | NUMBER OF INTERMEDIATE ELEMENTS TO REACH A PARTICULAR DESTINATION, INCLUDING THE DESTINATION ELEMENT |
| PRIMARY ELECTION KEY 1108 | UPTIME, OEID, MAC ADDRESS OF THE PRIMARY STACK SWITCH RECOGNIZED BY ORIGINATOR |
| SECONDARY ELECTION KEY 1110 | UPTIME, OEID, MAC ADDRESS OF THE SECONDARY STACK SWITCH RECOGNIZED BY ORIGINATOR |

FIG. 11

| STACK_SUPERVISION_MESSAGE | |
|---|---|
| MESSAGE TYPE 1202 | SUPERVISION |
| ORIGINATOR INFORMATION 1204 | OEID NUMBER, MAC ADDRESS, ORIGINATING PORT AND ELEMENT HARDWARE TYPE OF THE SENDER |
| PRIMARY IDENTIFICATION KEY 1206 | OEID AND MAC ADDRESS OF THE PRIMARY MASTER WITH RESPECT TO THE ORIGINATOR |
| SECONDARY IDENTIFICATION KEY 1208 | OEID AND MAC ADDRESS OF THE SECONDARY MASTER WITH RESPECT TO THE ORIGINATOR |
| ALONE 1210 | WHEN SET, INDICATES THAT THE NEIGHBOR HAS NO OPPOSITE NEIGHBOR |
| SCID REQUEST MATRIX 1212 | PROVIDES A LIST OF STACK ELEMENTS WHOSE PROCESSOR ID'S ARE UNKNOWN OR UNASSIGNED |

FIG. 12

STACK MANAGER PROTOCOL WITH AUTOMATIC SET UP MECHANISM

CROSS-REFERENCE TO RELATED APPLICATION

This application claims the benefit of U.S. Provisional Patent Application Ser. No. 60/623,370 filed Oct. 28, 2004, entitled "STACK MANAGER PROTOCOL WITH AUTOMATIC SET UP MECHANISM," which is hereby incorporated by reference herein for all purposes.

TECHNICAL FIELD

The invention generally relates to the management of a system of stack switches in a data communication network. In particular, the invention relates to a system of fault tolerance stack switches adapted to detect, cope with, and recover from switch failures.

BACKGROUND

In a system of stack switches in a packet switched network, the switches are operatively interconnected via a pair of designated stack ports present on each switch. The system of stack switches is generally coupled in series and the topology of the system is generally characterized by a closed loop called a ring or an open strand of switches referred to herein as a chain. Each of the stack switches is adapted to perform switching between its own data ports as well as the data ports of other stack switches by transmitting packets via the stack ports using stack switch identifiers that facilitate the efficient transmission and switching of these packets to the appropriate stack switch. Presently, stack switches may be assigned switch identifiers manually configured by a user, for example. There remains a need for stack switches adapted to automatically and deterministically assign identifiers to participating switches ordinally, that is, in accordance with the order in which the switches are positioned in the ring or the chain.

Presently, stack switch systems are also vulnerable to duplicate identifier assignments that may occur where two stack switches from different systems are combined or where a user erroneously assigns the same identifier twice. In present systems, stack switches are automatically shut down which, unfortunately, can sever the connectivity across the system and create islands of stack switches. There remains a need for stack switches that are adapted to preserve the communication link between two neighboring switches without the switches having duplicate identifiers being able to forward packets within the stack switch system. In this case, there is also a need (1) to define criteria to select which of the switches will prevail as well as to maintain the active but non-operational switch in a state where it can still receive management commands; and (2) to resolve the conflict without manual intervention.

Presently, stack switch systems also employ message exchanges between the primary master stack switch and the managed stack switches to determine each other's operational status. Under certain circumstances, however, the primary master may not posses the computational resources to immediately respond to a status check in which case the managed devices may erroneously conclude that the primary master has failed and initiate the selection of a new primary master. As a result, a stack switch system may possess two primary masters resulting in system wide failure. There is, therefore, a need for stack switches that are adapted to cope with intermittent interruptions without prematurely initiating changes in system management.

SUMMARY

The preferred embodiment of the present invention features a switching device for performing pass-through forwarding operations in a stack switch system comprising a plurality of stack switches. The switching device preferably comprises a plurality of ports and a routing engine for forwarding packets between the ports. The plurality of ports includes a plurality of data ports and a plurality of stack ports, i.e., a first stack port and second stack port, used to connect the switch to other stack switches. The routing engine is adapted to implement what is referred to herein as a pass-through mode. If the pass-through mode is disabled, the routing engine forwards packets between the plurality of ports dependent on destination address information, for example, associated with the packets. If, however, the pass-through mode is enabled, the routing engine automatically forwards packets received on the first stack port to the second stack port, and automatically forwards packets received on the second stack port to the first stack port. Packets received on the data ports are generally discarded. As such, the switch can maintain minimal connectivity in the stack switch system without the need to be fully operational or fully integrated into the stack switch system. The pass-through mode may be employed where two stack switches possess the same identifier, for example.

The preferred embodiment of the present invention also features a switching device for automatically assigning stack switch identifiers. Each of a plurality of stack switches—including a primary master stack switch responsible for the assignment as well as all managed stack switches adapted to assume the role of the primary master—comprise two stack ports and a stack manager adapted to identify the stack switches requiring an operational stack switch identifier, and automatically assign each of said one or more stack switches one of a set of operational stack switch identifiers. The set of operational stack switch identifiers preferably includes sequential integers, although one of ordinary skill will recognize that there may be gaps in the sequence due to the prior assignment of some identifiers to one or more of the stack switches. The sequential integers are then assigned in accordance with the sequential position of said one or more stack switches in the series. Assuming none of the stack switches had a pre-existing identifier, the resulting switches may be sequentially numbered in ascending order from "one" starting with primary master, for example. If the stack switches possess a ring topology, the neighbor stack switch on its first stack port will be assigned the lowest available identifier while the neighbor stack switch on the second stack port will be assigned the highest available identifier from the set of identifiers, assuming the primary master has already been assigned an identifier. If in a chain topology, the lowest available identifier is generally assigned to the primary master or to a switch reachable through one of the stack ports of the master and the available identifiers assigned to switches, as needed, in sequential order as if the stack switches were coupled in a ring. The resulting identifier assignment better reflects the sequential position of the stack switches and is more cognitively user-friendly than prior art assignment schemes presently practiced.

The preferred embodiment of the present invention also features a switching device for automatically and temporarily disabling supervision messages exchanged by stack switches to monitor the status of the stack system and detect changes in the topology. The system generally includes one or more managed stack switches and a primary master stack switch for managing those devices. The managed stack switches are adapted to transmit supervisory or supervision messages to one or more of the plurality of stack switches, including the primary master. The primary master, in turn, is adapted to respond to the supervision messages if possible or, in the alternative, to transmit a supervision suspension message to temporarily prevent the one or more of the plurality of managed stack switches from transmitting the supervision messages. The primary master may also rescind the supervision suspension message to resume standard operations. In some embodiments, the managed devices are also adapted to automatically resume the periodic transmission of the supervision messages after a predetermined period of time should the primary master fail to return to an operational status.

The preferred embodiment of the present invention also features a method of electing a primary master stack switch from among the plurality of stack switches when the system is initialized or the designated primary master becomes non-operational. The method comprises the steps of generating an election key for each of the plurality of stack switches; exchanging the election key of each stack switch among the plurality of stack switches; and tentatively assigning the stack switch with the lowest election key to be the primary stack switch. The election key for a switch includes the uptime for the associated stack switch—i.e., the date, hour, minute, and second, for example—that the switch reached a predetermined operational state following boot-up. In the preferred embodiment, the uptime is associated with the time at which the switch is adapted to initiate a preliminary assessment of the topology of the network including the presence of other stack switches.

BRIEF DESCRIPTION OF THE DRAWINGS

The present invention is illustrated by way of example and not limitation in the figures of the accompanying drawings, and in which:

FIG. 11 is a representative stack election message, in accordance with the preferred embodiment of the present invention; and FIG. 12 is a representative stack supervision message, in accordance with the preferred embodiment of the present invention.

DETAILED DESCRIPTION OF THE PREFERRED EMBODIMENT

Figure 1:
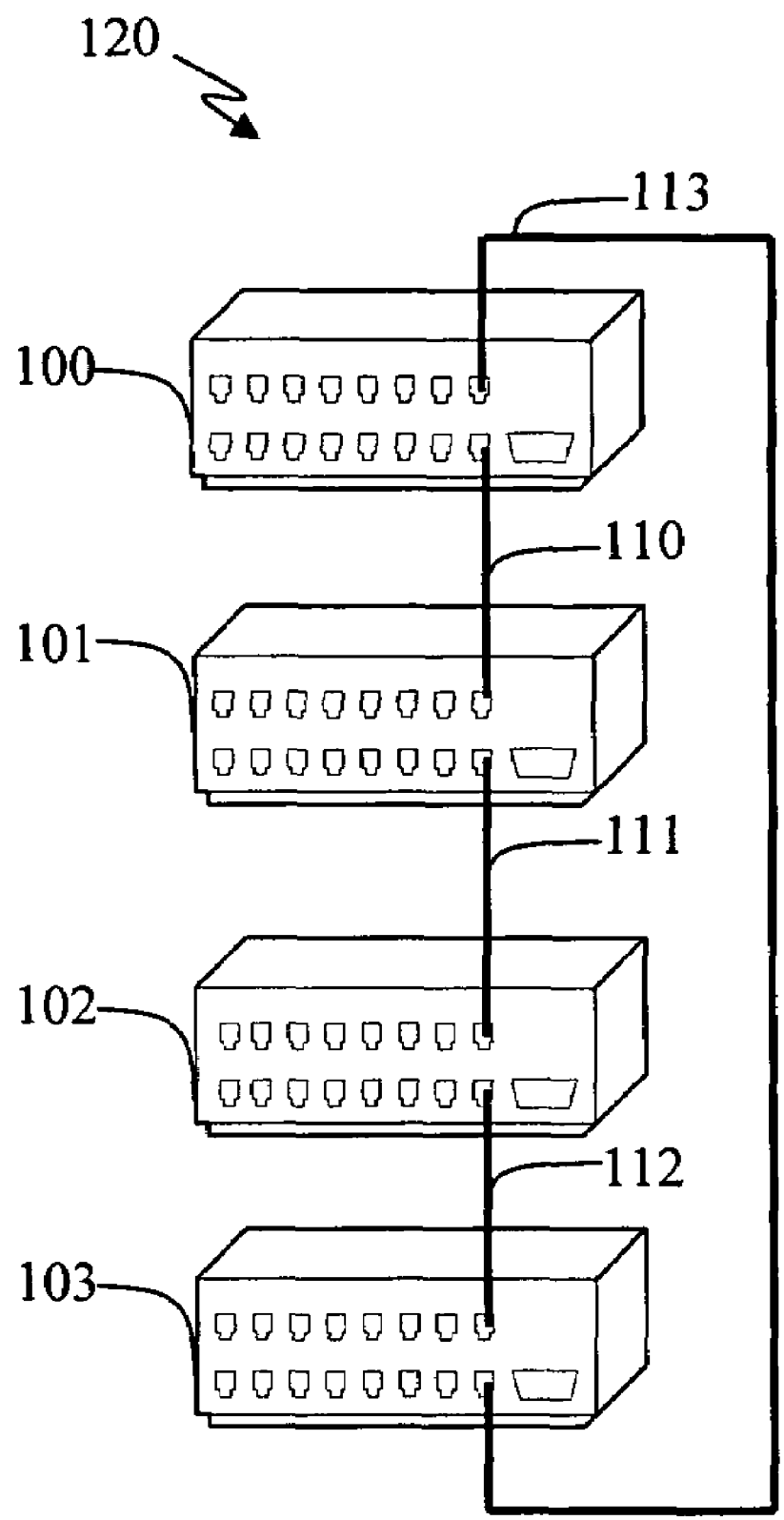
FIG. 1 is a functional block diagram of a system of integrated stack switches (ISS), in accordance with the preferred embodiment of the present invention.

Illustrated in FIG. 1 is a functional block diagram of a system of integrated stack switches (ISS) in a data communications network. The network 120 includes a plurality of stack switches 100-103 operatively linked in series to form a chain or a ring topology, for example, by means of stack links 110-113, e.g., twisted-pair or fiber optic cables. The switching devices 100-103 are preferably stackable switches operatively coupled to one another through one or more special-purpose ports referred to by those skilled in the art as stack ports. The plurality of stack switches 100-103, also referred to as stack elements and elements herein, are adapted to transmit packetized data between the other switches of the ISS 120 as well as one or more end stations and other addressable entities operatively coupled to the ISS via one or more local area networks (LANs), wide area networks (WANs), metropolitan area networks (MANs), or the Internet, for example.

In the preferred embodiment, the stack switches 100-103 are multi-layer switches adapted to perform switching and routing operations with protocol data units (PDUs), preferably frames and packets, at Layer 2 (Data Link Layer) and Layer 3 (Network Layer) as defined by the Open Systems Interconnect (OSI) reference model, although they may also perform Layer 4-7 switching operations. Each of the stack switches 100-103 is generally capable of functioning as a stand-alone network bridge, switch, or router. With the integrated stack manager protocol (ISMP) of the preferred embodiment, however, the stack switches 100-103 cooperate to emulate a single switching device more powerful than the merely aggregation of the individual switches 100-103 in stand-alone operation. The resulting ISS 120 is adapted to provide scalable networking capability with enhanced fault tolerance and user convenience. In particular, the ISS 120 of the preferred embodiment can dynamically scale to incorporate additional stack switches, detect non-operational stack switches and stack links, dynamically route around—and in some cases through—the non-operational stack switches, and automatically configure the stack switches 100-103 to produce a non-redundant identification scheme to facilitate inter-stack switch forwarding operations.

Figure 2:
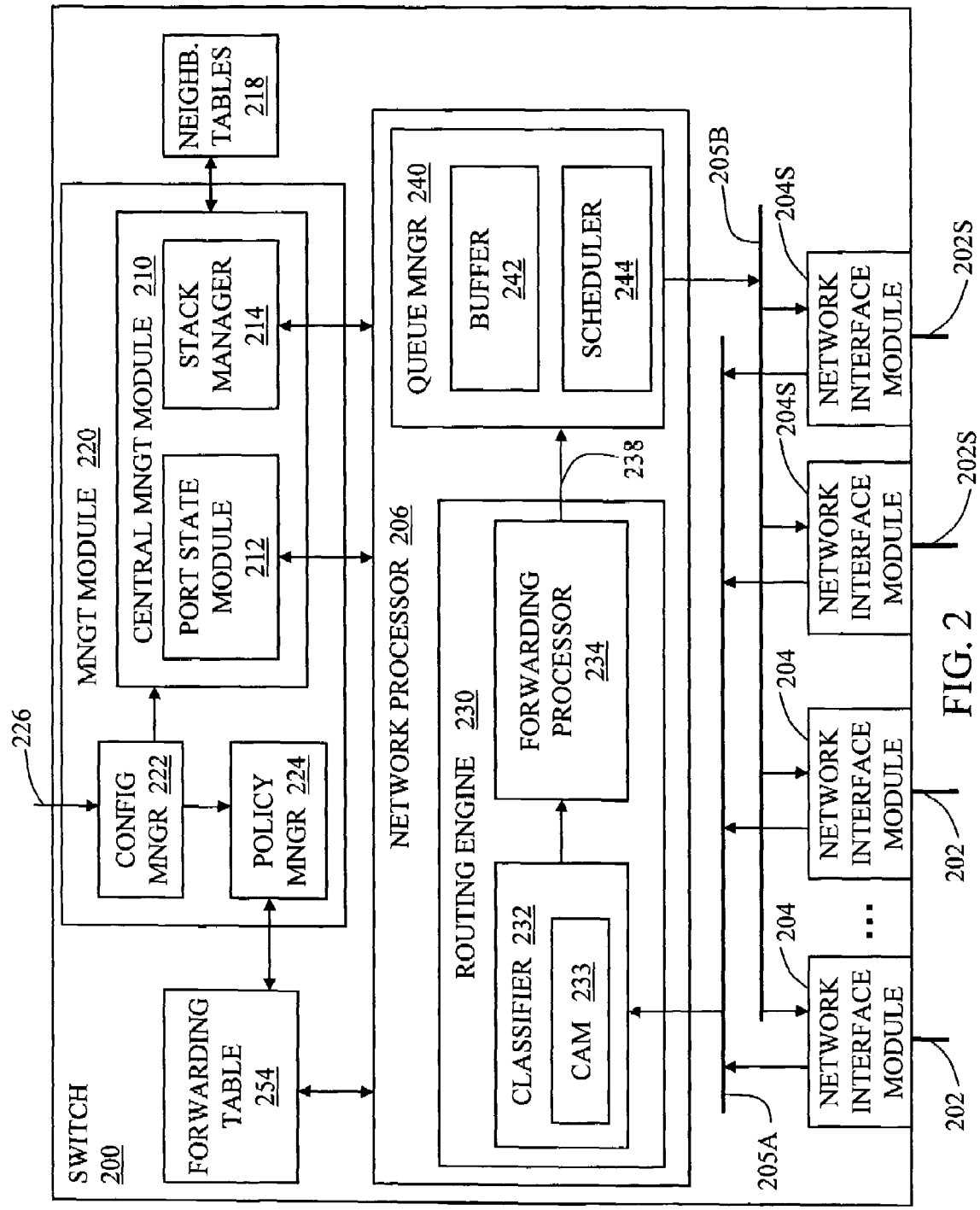
FIG. 2 is a functional block diagram of a stack switch employed in the ISS system, in accordance with the preferred embodiment of the present invention.

Illustrated in FIG. 2 is a functional block diagram of a stack switch employed in the ISS system of the preferred embodiment. The stack switch comprises one or more network interface modules (NIMs) 204, one or more switching controllers (network processors) 206, and a management module 220 all of which preferably cooperate to receive ingress data traffic and transmit egress data traffic via each of the external ports 202. For purposes of this embodiment, data flowing into the switch 200 from another network node is referred to herein as ingress data, which comprises ingress protocol data units. In contrast, data propagating internally to an external port 202 for transmission to another network node is referred to as egress data, which comprises egress PDUs. Each of the plurality of the external ports 202 is a duplex port adapted to receive ingress data and transmit egress data.

The NIMs 204 and 204S preferably include one or more physical layer interfaces and media access control (MAC) interfaces adapted to exchange PDUs, e.g., Ethernet frames and IP packets, via network communications links (not shown). Among the plurality of external ports 202 are two exemplary stack ports 202S for incorporating the particular stack switch 200 into the ISS 120. The NIMs 204S associated with the two stack ports 202S are, for example, standard Ethernet ports and are adapted to exchange PDUs conventional data traffic with various compatible nodes as well as inter-stack communications to other stack switches depending on the stack configuration mode. The ingress PDUs are conveyed from the plurality of NIMs 204 and 204S to the switching controller 206 by means of one or more ingress data buses 205A. Similarly, the egress PDUs are transmitted from the switching controller 206 to the plurality of NIMs 204 and 204s via one or more egress data buses 205B.

The management module 220 generally comprises a policy manager 224 for retaining and implementing traffic policies. The policies implemented by the policy manager 224 are preferably based in part on Layer 2 and/or Layer 3 addressing information derived from source learning operations, route information received from other routing devices, and filtering rules uploaded by the network administrator via a configuration manager 222 using, for example, simple network management protocol (SNMP) messages 226. The traffic policies derived from source learning, other network nodes, and the administrator are made available to the routing engine 230 and collectively represented by the forwarding table 254.

In addition to the traffic policies, the management module 220 further includes a central management module (CMM) 210 for implementing the ISS stack switching functions discussed in more detail below. The CMM 210 of the preferred embodiment comprises a port state module 212 and a stack manager 214. The port state module 212 is adapted to monitor the operational state of the stack ports 202S using keep-alive signals, for example, and identify the presence of adjacent stack switches coupled to the stack ports 202S.

The CMM 210 in the preferred embodiment further includes a stack manager 214 adapted to participate in the elections that determine each stack switches management responsibilities, process supervision messages used to monitor the status of the other switches, and if necessary, serve as a primary master switch (PMS) or a secondary master switch (SMS) whose responsibilities may include assigning unique element identifiers to one or more stack switches 100-103 and assign processor identifiers to network processors of the stack switches 100-103. In the preferred embodiment, the stack manager 214 is enabled with communications protocol capable of fully operating based on the exchange of messages with the adjacent neighbors only. This is so because a stack manager 214 instance running on a stack switch 100-103 must be able to communicate with other instances running on remote switches even before the topology of the stack of switches ISS is known.

In addition, the stack manager 214 is adapted to determine the ISS stack switch topology and process topology related messages exchanged between stack switches of the ISS 120. In particular, the stack manager 214 transmits ISS topology requests, transmits known ISS topology information to other stack switches, and maintain one or more local topology tables. In some embodiments, the stack manager 214 is also responsible for detecting the loss of an element, insertion of an additional element (causing a trap to be generated), removal of an element from the stack, and determining the operational state of the associated CMM 210.

The stack manager 214 in the preferred embodiment maintains and updates one or more stack switch neighbor tables 218, preferably one associated with each of the stack ports 202S. A neighbor table 218 is a listing of those stack switches reachable through the associated stack port 202S. In the preferred embodiment, the neighbor stack switches are recited in sequential order with the element immediately adjacent to the port listed first. Each of the two stack ports keeps a neighbor table 218 which lists all neighboring stack switches reachable through that stack port. If the topology of the ISS 120 is a ring configuration, both neighbor tables 218 have the same list of neighboring stack switches but in reverse order.

The switch 200 preferably comprises at least one network processor 206 capable of, but not limited to, Layer 2 (Data Link) and Layer 3 (Network) switching operations as defined in the Open Systems Interconnect (OSI) reference model. The set of possible Layer 2 protocols for operably coupling the external ports 202 to a wired and/or wireless communications link include the Institute of Electrical and Electronics Engineers (IEEE) 802.3 and IEEE 802.11 standards, while the set of possible Layer 3 protocols includes Internet Protocol (IP) version 4 defined in Internet Engineering Task Force (IETF) Request for Comment (RFC) 791 and IP version 6 defined in IETF RFC 1883.

The network processor 206 preferably comprises a routing engine 230 and a queue manager 240. The routing engine 230 comprises a classifier 232 that receives ingress PDUs from the data bus 205A, inspects one or more fields of the PDUs, classifies the PDUs into one of a plurality of flows using a content addressable memory 233, and retrieves forwarding information from the forwarding table 254 retained in high-speed memory. The forwarding information retrieved from the forwarding table 254 preferably includes, but is not limited to, a flow identifier used to specify those forwarding operations necessary to prepare the particular PDU for egress, where the flow identifier may include the next-hop address and class of service (COS) or Quality of Service (QOS) provisions.

The forwarding processor 234 receives the ingress PDUs with the associated forwarding information and executes one or more forwarding operations prior to transmission to the appropriate egress port or ports. The forwarding operations preferably include but are not limited to header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are allocated switch resources, color marking used for policing and traffic shaping, and inter-stack switch labeling management used to efficiently distribute PDUs between switches 100-103 of the ISS 120, for example.

After the forwarding processor 234, the PDUs are passed to and stored in the queue manager 240 until bandwidth is available to transmit the PDUs to the appropriate egress port. In particular, the egress PDUs are buffered in one or more of a plurality of priority queues in the buffer 242 until they are transmitted by the scheduler 244 to an external port 202 via the output data bus 205B.

The network processor 206 may possess an internal switch fabric (not shown) operatively linking each external port 202 of the switch to every other port on the switch. In the preferred embodiment, the internal switch fabric may be configured to channel ingress traffic from each of the two stack ports 202S to the other stack port while bypassing the classifier 232 and forwarding processor 234 to effect the pass-through mode discussed in more detail below.

Figure 3:
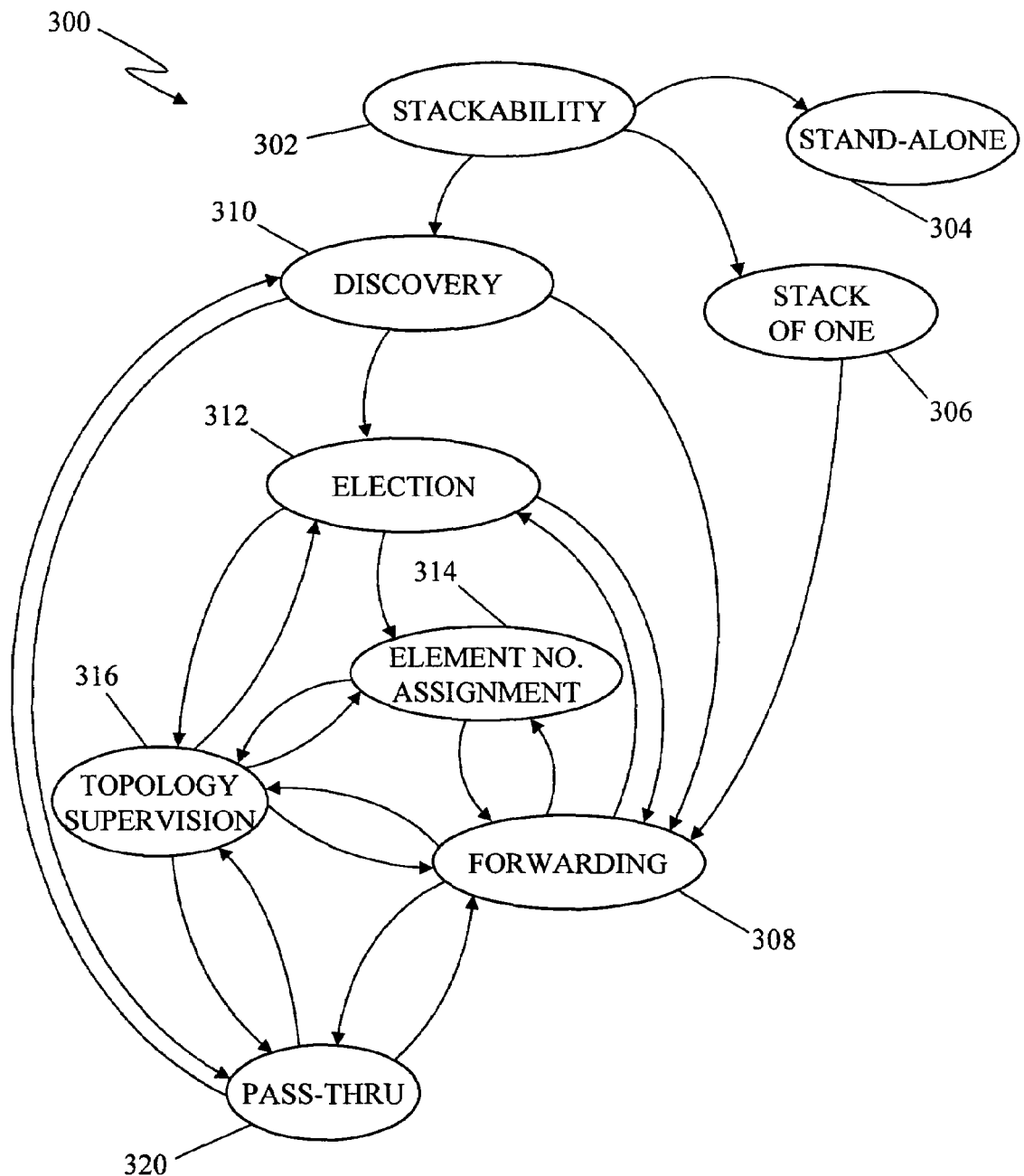
FIG. 3 is a state diagram representing the stages of a stack switch during start up, in accordance with the preferred embodiment of the present invention.

Illustrated in FIG. 3 is a state diagram representing the stages of an automatic setup mechanism employed by a stack switch of the ISS from boot-up to the fully operational mode. Upon initialization, a stack switch 200 enters a stackability determination state 302 in which the switch determines whether it is configured to serve as a stand-alone switch or a stack switch. The stackability is determined based on the physical and operational presence of stack ports 202S. In some embodiment of the invention, it is possible that no stack port is present in a switch. If the switch is configured to serve as a stand-alone operation 304, the stack manager 214 is disabled and the switch operates in accordance with a multi-layer switch having all data ports 202. When configured as a stack switch, however, the port state module 212 monitors the stack ports for keep-alive messages or other signals indicating the presence of adjacent elements. In the absence of an adjacent stack switch, the switch determines that it is a stack of one 306 and proceeds to the forwarding state 308 in which it receives and transmits data traffic on the standard data ports 202 while monitoring the stack ports 202S for the introduction of one or more additional stack elements.

If one or more switches are detected on the stack ports 202S while in the stackability determination state 302, the switch 200 proceeds to the discovery state 310 for purposes of determining the topology of the ISS 120. The stack switch 200 may then proceed to the election state 312 in which the stack switches of the ISS 120 execute a role determination process used to identify which of the elements are to serve as the primary master switch (PMS) and secondary master switch, also referred to herein as the primary master and secondary master, respectively.

The primary master is responsible for ISS management functions including the allocation and distribution of element identifiers, for example, by which all stack switches in the ISS address one another, as well as the handling of all command line interface input and synchronizing images—i.e., synchronizing different software versions on the stack switches. The secondary master is the designated successor to the primary master and assumes the role of the primary if it should fail or otherwise become non-operational. While each of the stack switches enabled with the ISMP protocol of the preferred embodiment may assume the role of the primary and secondary masters, the remaining stack switches defer to the master switches until any one of them is later elected to serve as a master in accordance with the hierarchical election process discussed in more detail below.

The primary master proceeds from the election state 312 to the element number assignment state 314 while every other stack switch proceeds to the forwarding state 308. In the element number assignment state 314, the elected primary master assigns an operational element identifier (OEID) to each stack switch that has not already been assigned an element identifier. The OEID is set equal to a saved element identifier (SEID) retained in the switches persistent memory if valid. While the OEID is used by a stack switch to send and receive messages between other stack switches, it is valid only for the lifetime of the stack switch, i.e., until re-booted. If a stack switch has a valid SEID on power-up, the OEID is set equal to the SEID. Otherwise, the stack switch is assigned an OEID by the primary master through the element number assignment mechanism, at which time the SEID is set equal to the OEID.

While operating in the forwarding state 308, the switch 200 is adapted to transition into and back from the supervision state 316 and the pass-through (PT) state 320. In the supervision state 316, the switch 200 transmits supervision messages to both its adjacent neighbors for supervisory purposes, analogous to a keep-alive mechanism for exchanging keep-alive messages When a new stack switch is inserted into the ISS 120 or an existing switch is removed, for example, the switch 200 automatically exchanges topology information with other stack switches and updates its stack switch neighbor tables. If both the primary and secondary masters fail at the same time, the rest of stack switches—which most likely in the forwarding state 308—proceed to the election state 312 to elect a new primary master. If the secondary master fails, there is no election, but the primary master chooses one of the idle elements to take the secondary role. Once this element is chosen, the primary master advertises the new assignment to the entire stack with an election indication message that is vested with maximum authority. If the primary master fails, there is no real election, but the secondary master promotes itself to become the new primary master and chooses one of the idle elements to become the new secondary master. Once this element is chosen, the new primary master advertises the new assignment to the entire stack with an election indication message that is vested with maximum authority.

In the pass-through (PT) state 320, the data ports 202 of the stack switch are entirely disabled and the routing engine 230 is configured to pass data traffic from each of its two stack ports 202S to the opposite stack port. In the PT state 320, the routing engine 230 effectively emulates a fixed wire connection between the stack ports of the two adjacent stack switches, thus preventing what would otherwise be a break in the continuity of the system of stack switches 120. The pass-through may be used to maintain continuity between the stack switches adjacent to a common element instead of shutting down, thereby maintaining the ISS 120 where stack switch systems not practicing the exemplary embodiment would otherwise have had their ring topology severed or two independent chains created.

In the preferred embodiment, an element may revert to the pass-through mode where, for example, two elements possess the same OEID. A plurality of stack switches may initially posses the same OEID where configured with the same manufacturer-set default EID or the same user-defined SEID retained in persistent memory, for example. Where two or more elements posses the same OEID, all but one of the two or more stack switches transition to the PT state 320 until the primary assigns each a new unique OEID, and upon this event they may return to the forwarding state 308. In particular, the primary master uses a global element identifier (GID) to send an element in the pass-through state 320 its new OEID as well as other management commands necessary to reconfigure the element and return it to the forwarding state 308. The global element identifier (GID) comprises the OEID and one or more additional identifiers such as the stack switch's media access control (MAC) address or the switch's serial number, for example, thereby uniquely identifying each stack switch even when the OEIDs of two switches are the same.

As illustrated, a stack switch may transition in either direction between the discovery state 310 and the supervision state 316 since supervision is required and is enforced as early as discovery state 310 when a stack switch detects a neighbor and must, therefore, execute supervisory tasks described in more detail below.

A. Stackability Determination State

Figure 4:
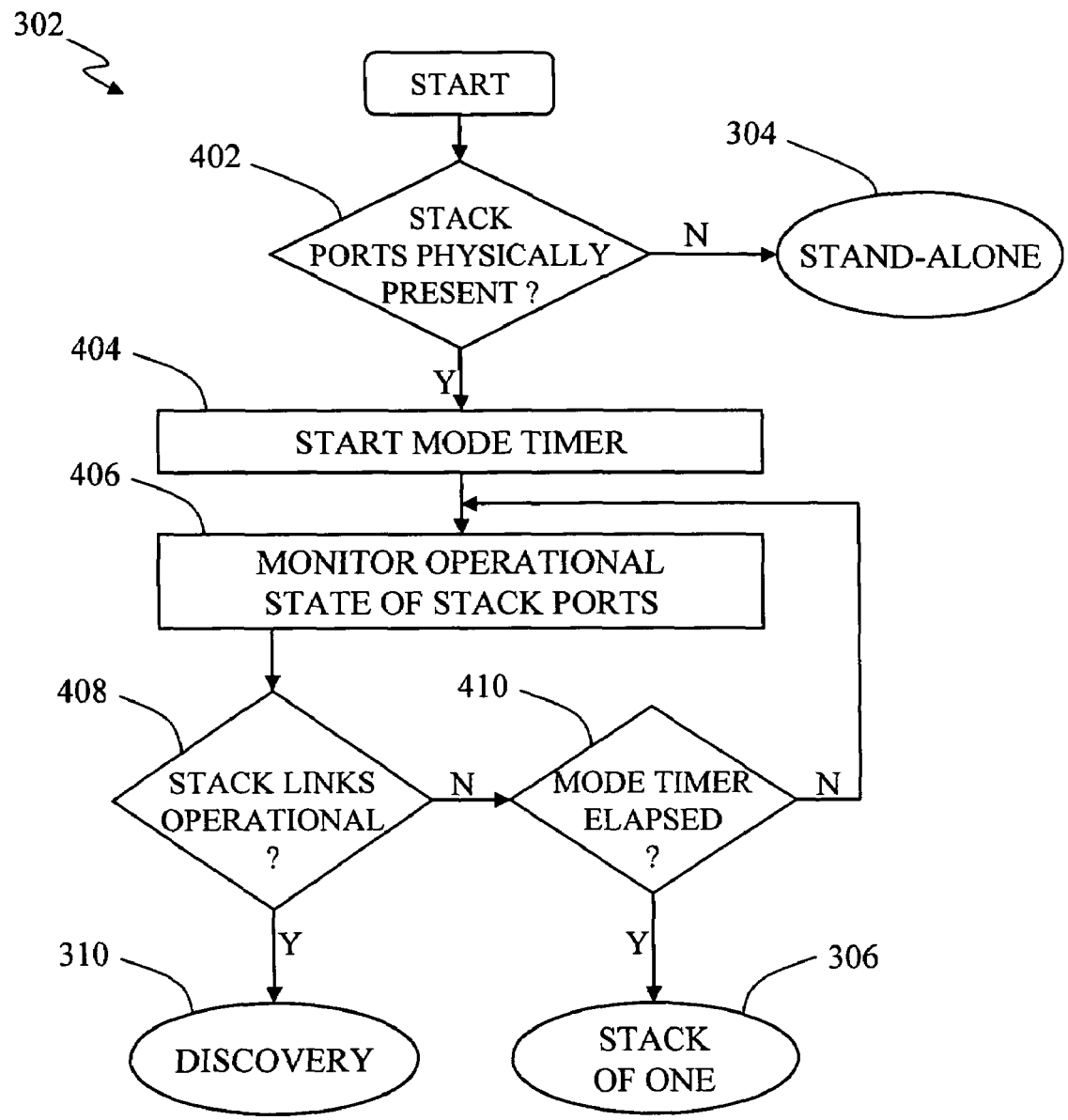
FIG. 4 is a flow chart corresponding to the stackability determination state of FIG. 3, in accordance with the preferred embodiment of the present invention.

Illustrated in FIG. 4 is a flow chart corresponding to the stackability determination state of FIG. 3. Upon initialization of a stack element, the port state module 212 determines whether the switch has been configured by the network administrator to operate as a stackable switch. If not, the stack port state decision block 402 is answered in the negative, and the switch is enabled to perform standard forwarding operations as a stand-alone switch without the benefits attributable to an integrated system of stack switches employing the ISMP. If the switch has been configured to operate as a stack switch, the central management module 210 and the stack manager 214 in particular begins (step 404) a mode timer that defines the period time that the switch is allotted to determine connectivity to one or more additional stack switches. In order to detect these stack switches, if present, the stack manager 214 listens on the stack ports 202S for the presence of keep-alive messages or other type of signals indicating that the stack link is operational. Other detection mechanisms may monitor for electrical signals generated by stack switches or may exchange co-related keep-alive messages that employ message sequence numbers to establish a relationship with the preceding keep-alive message sent, thereby ensuring bi-directional communication. Upon confirmation of an adjacent stack switch, the stack links operational testing (step 408) is answered in the affirmative and the switch 200 proceeds to the discovery state 310. In the absence of an adjacent stack switch and upon the expiration of the mode detection time, the mode timer elapsed test 410 is answered in the affirmative and the stack switch 200 is initialized as a stack of one (state 306), thus enabling the network administrator to later couple one or more stack switches to the stack ports 202S to construct an ISS 120.

B. Discovery State

Figure 5:
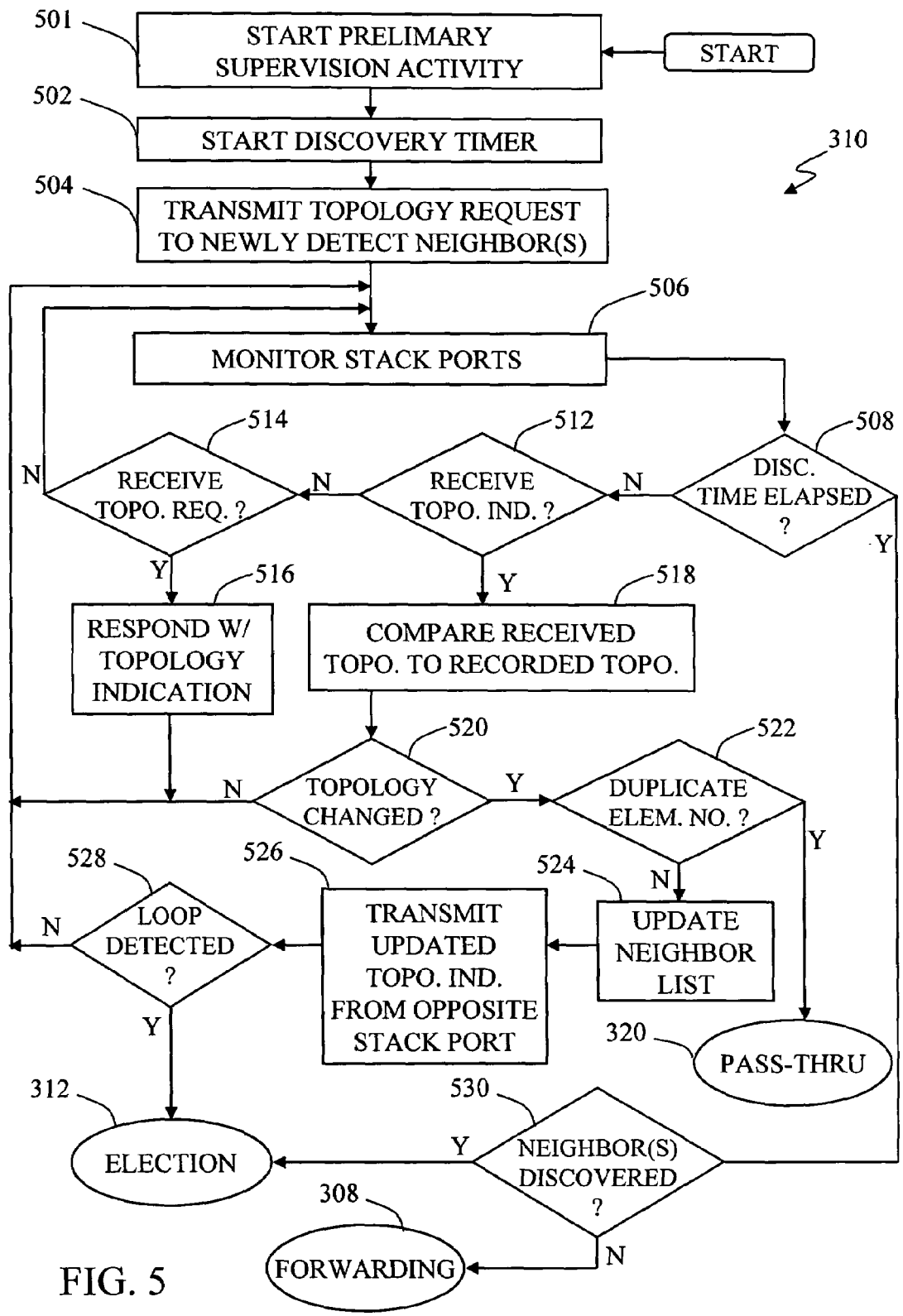
FIG. 5 is a flow chart corresponding to the discovery state of FIG. 3, in accordance with the preferred embodiment of the present invention.

Illustrated in FIG. 5 is a flow chart corresponding to the discovery state (state 310) of FIG. 3. Upon entry into the discovery state 310, the stack switch 200 initiates preliminary supervisory activity 501 and determines the topology of the plurality of stack switches of the ISS 120. The preliminary supervision activity 501 includes the start of a supervision timer and the initial transmission of keep-alive messages. Keep-alive messages are transmitted from the stack switches as early in the boot-up process as possible to increase the probability that a neighboring stack switch detects the particular stack switch before concluding that the there are no switches reachable through the associated stack port. In some embodiments, a stack switch further compares information in the received keep-alive messages with the local data to make preliminary determinations about the topology and changes in role assignments, i.e., whether the primary or secondary master switch has changed.

The period of time afforded to learn the topology is defined by a discovery time period, which is started (step 502) upon entry into the discovery state 310. Topology request messages requesting the identity of known stack switches are then transmitted (step 504) from each of the stack ports 202S on which an adjacent stack has been detected. Similarly, the switch 200 also monitors (step 506) its stack ports 202S for topology related messages from adjacent stack switches until the discovery time interval has elapsed.

If a topology request is detected on any of the stack ports 202S, the received topology request test 514 is answered in the affirmative and the element 200 answers (step 516) with a topology indication message. The topology indication message includes a listing of one or more stack switches of the ISS 120 of which it is aware, namely the elements listed in the stack neighbor table 218 associated with the opposite stack port. When the topology indication is detected, the received topology indication test 512 is answered in the affirmative and the present switch 200 compares (step 518) the topology of the known stack switches with the topology of the received list of stack switches. If the topologies are different, and if the stack switch identifier provided by each stack switch is unique within the ISS 120 (test 522), the stack switch 200 updates (step 524) one of its neighbor tables 218—that is, the one associated with the stack port on which the topology indication message is received—with the identities of the newly learned stack switches, preferably including the OEID, SEID, MAC address, switch hardware type, and uptime. In the preferred embodiment, the stack switch automatically transmits (step 526) an updated topology indication with the newly learned topology from the other of the two stack ports 202S to the adjacent stack switch, if present.

If the topology represented by the stack neighbor table associated with the first stack port, termed the first stack neighbor table, is the same as and opposite to the topology represented by the stack neighbor table associated with the second of the pair of stack port 202S, termed the second stack neighbor table, the loop detection test 528 is answered in the affirmative and the switch 200 proceeds to the election phase 312. If a stack switch, however, detects that it is using the same operation element identifier as another switch—which can occur where a plurality of stack switches possess the same default value or user defined stack switch identifier, for example—the switch with the lower priority identifier immediately transitions to the pass-through (PT) state 320 in order to prevent an addressing ambiguity.

Assuming no loop is detected in the ISS 120, the discovery time will elapse and the stack switch 200 proceeds to the forwarding state 308 in the absence of the discovery of neighbor stack switches or to the election state 312 if one or more neighbor stack switches is detected (test 530) in the ISS 120.

Upon completion of the discovery state 310, all stack switches preferably have exchanged topology indication messages and learned the OEIDs of every other stack switches present in the ISS 120. In the preferred embodiment, the stack switches also propagate each stack switch's uptime and MAC address which, together with the OEID, constitute an election key used to facilitate stack elections in accordance with the procedure described below.

C. Election State

Figure 6A:
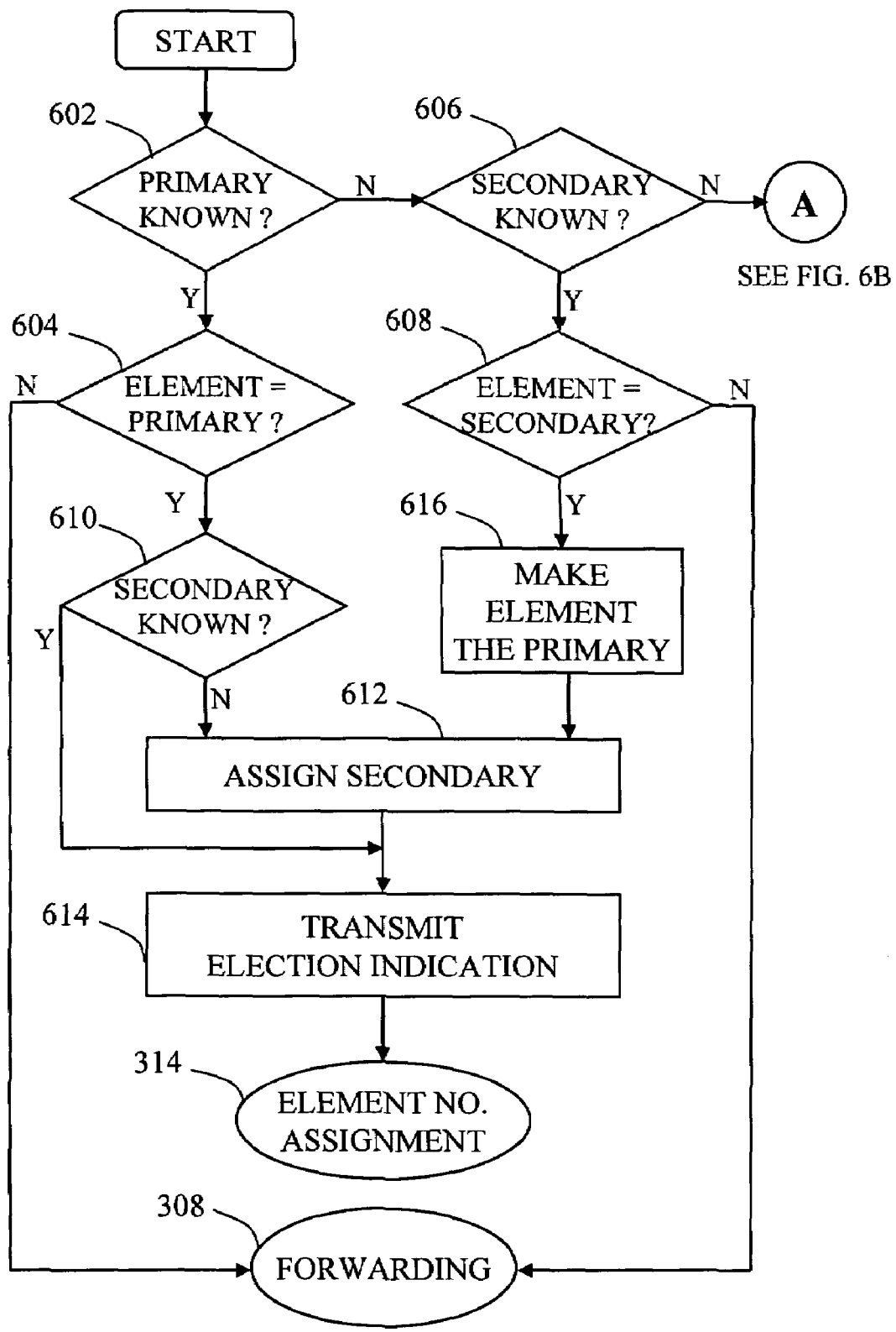
FIGS. 6A and 6B taken together is a flow chart corresponding to the election state of FIG. 3, in accordance with the preferred embodiment of the present invention.
Figure 6B:
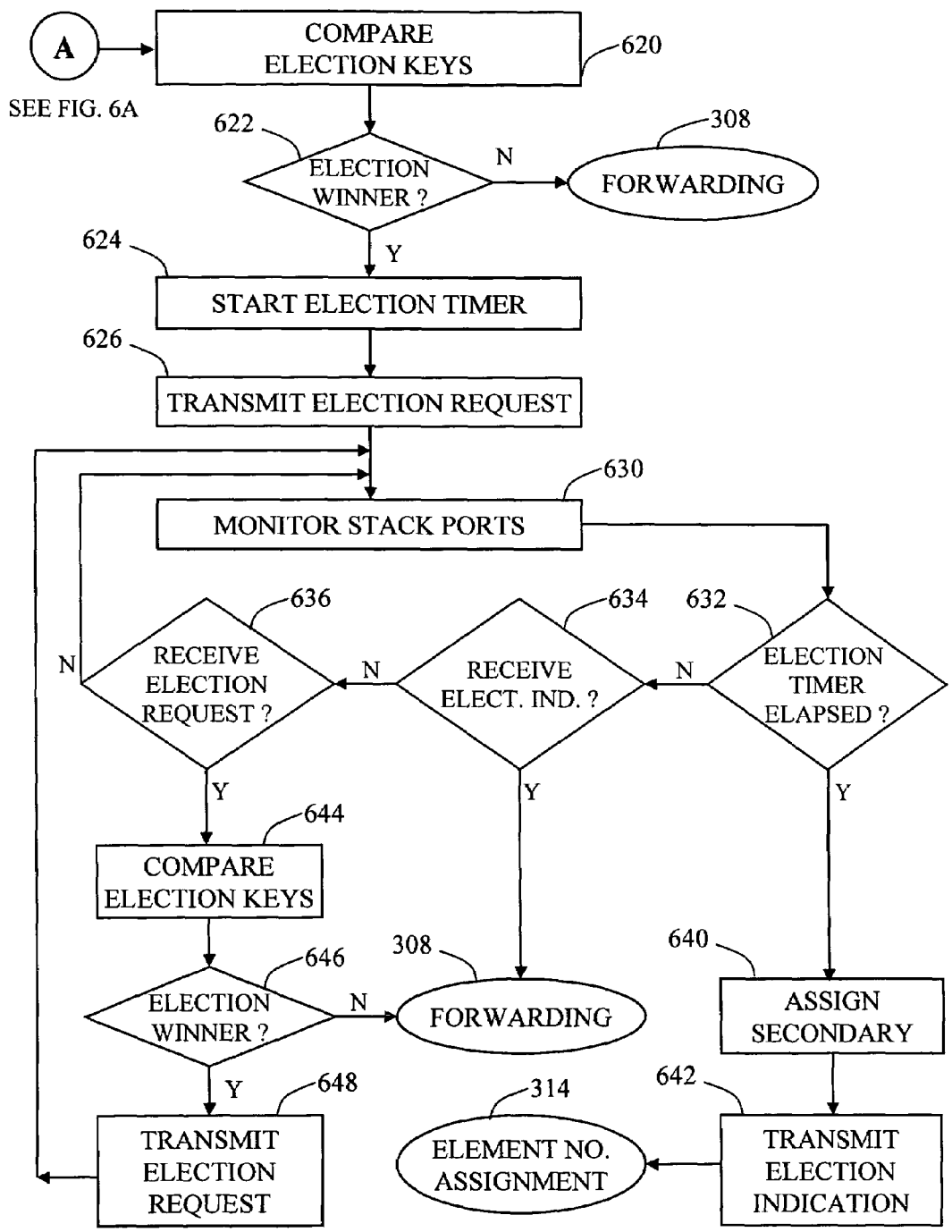

Illustrated in FIGS. 6A and 6B taken together is a flow chart corresponding to the election state of FIG. 3. Upon entry into the election state 312, the stack switch 200 determines the managerial role of the stack switches, i.e., whether the switch is to serve as the primary stack switch, the secondary stack switch, or an idle stack switch. The primary master, which includes the primary CMM by definition, is the switch responsible for assigning operation element identifiers, while the secondary stack switch is synchronized with the primary master in preparation of assuming the role of the primary master should it become non-operational.

If the primary master is identified, the primary master known test 602 is answered in the affirmative. If the stack switch 200 is itself the primary master (test 604), the switch proceeds to determine (step 612) the secondary master if not already identified (test 610). In the preferred embodiment, the secondary master is selected to be the stack switch with the lowest election key, second only to the primary master. In the preferred embodiment, a stack switch that recognizes itself as the primary master transmits (step 614) an election indication advertising itself as the primary to every other switch in the ISS 120. If the primary master is known but different than the present stack switch 200, the switch proceeds to the forwarding state 308 and defers to the primary master to make any requisite ISS 120 management operations including the assignment of new stack switch identifier, for example, discussed in more detail below.

In the absence of a known primary master, the stack switch 200 determines (step 606) whether a secondary master is known. If the switch 200 is itself the secondary stack switch, the switch promotes itself to the primary master and transmits (step 614) the election indication messages before transitioning to the element number assignment state 314. If the present stack switch knows of a secondary master different than itself, the stack switch assumes the idle role and advances to the forwarding state 308.

In the absence of a known primary and secondary masters, the stack switch 200 attempts to determine, i.e., elect, an element of the ISS 120 in accordance with the procedure set forth in FIG. 6B. In particular, the plurality of stack switches preferably follow a hierarchical numbering scheme to identify the element with the lowest election key (defined below), although various other priority schemes known to those skilled in the art may also be suitable. The election key preferably comprises the switch's uptime, OEID, and MAC address. The uptime represents the time the switch was powered up and entered the stackability determination step 302. The OEID is preferably an eight bit number used to uniquely identify each stack switch from every other stack switch of the ISS 120. The OEIDs are generally assigned automatically by the primary master although one or more may also be defined by the network administrator.

With all the plurality of stack switches now discovered and the election key of each of the switches propagated to every other switch in the ISS 120, the present stack switch 200 locally determines whether it should assume the role of the primary master by first comparing (step 620) its election key to the election key of every of stack switch. If the present switch 200 determines that it has a lower priority election key, the election winner test (step 622) is answered in the negative and the switch transitions to the forwarding state 308. If, however, the present switch 200 determines that it has the highest priority election key and therefore the election winner, the switch tentatively assumes the role of the primary master, starts (step 624) an election time defining the period of time, preferably three seconds, that the switch is allotted to complete the election and converge to the next state. The stack switch 200 in the preferred embodiment also distributes one or more election request messages (step 626) to notify other elements in the ISS of its tentative role as the primary master.

As one of ordinary skill in the art will appreciate, one of the purposes of the election request messages and election timer is to prevent two or more elements from inadvertently and catastrophically promoting themselves to the role of the PMS in the same ISS 120. One or more stack switches in the ISS 120 may come to believe that it is the primary master if, for example, a stack element or stack link fails during the discovery phase (state 310) or a new element is powered immediately after the discovery phase was completed, thus temporarily dividing the ISS 120 into two or more disconnected segments that each elect a different primary master. To prevent this scenario from crashing the ISS 120, each stack switch of the preferred embodiment that determines itself to be the primary master distributes (step 626) one or more election request messages, preferably three, to every other stack switch tentatively assuming the role of the primary master, thus providing the competing switches an exemplary mechanism to facilitate the arbitration of the primary role through notification and key comparison.

As stated above, if the switch 200 detects (test 636) another election request before the election timer has elapsed (test 632), the switch compares (step 644) its election key to the election key of the other stack switch tentatively operating as the primary master. The winning switch, which is selected based on the highest priority election key, re-asserts itself as the primary by re-transmitting (step 648) its election request while the losing switch proceeds to the forwarding state 308. The winning primary master distributes (step 642) the election indication message to all the stack elements to inform them of the identity of the new primary and secondary masters. Elements other than the secondary master, whose role is currently unassigned, will assume the idle role upon reception of this message.

Before the election time has elapsed, a stack switch that has received (test 634) an election indication gives effect to the message by proceeding to the forwarding state 308 without transmitting any further election request messages. In general, each element that receives election indication message must always honor the message, except where another element has also assumed the role of the primary master. This exception is needed to reconcile scenarios where multiple primaries are present on the same stack due to stack merging conditions or when two faults occur in the ring.

In the absence of another stack switch attempting to serve as the primary master, the election timer elapses (test 632), the stack switch 200 assigns (step 640) a secondary master, transmits an election indication (step 642); and proceeds to the element number assignment state 314.

As introduced above, the election state 312 employs two categories of election message in the preferred embodiment, namely (a) election request messages used by elements to request the primary role or to request the identity of the current primary, and (b) election indication messages used by the primary master to advertise its identity as well as the identity of the secondary master to the rest of the stack members. Illustrated in FIG. 11 is a representative stack election message format employed in the preferred embodiment. The stack election message 1100 includes a message type field 1102 distinguishing between an election request and an election indication; an originator identification key 1104 including an OEID and MAC address pair, which preferably uniquely identify the element from every other element in the ISS 120 whether or not two elements possess the same OEID; a hop count field 1106 used to track the number of elements through which the message propagates upon arriving at the destination stack switch; a primary election key field 1108 including the uptime, OEID, and MAC address of the primary stack switch recognized by the originating element; and a secondary election key field 1110 including the uptime, OEID, and MAC address of the secondary stack switch recognized by the originating element. The hop count field 1106 is initially defined in accordance with a predetermined number by the stack switch that originates the message. In the process of transmitting the message from element to element via their stack ports, the hop count is decremented at each intermediate stack switch until the hop count is zero, at which time the message is deleted.

D. Element Number Assignment State

Figure 7A:
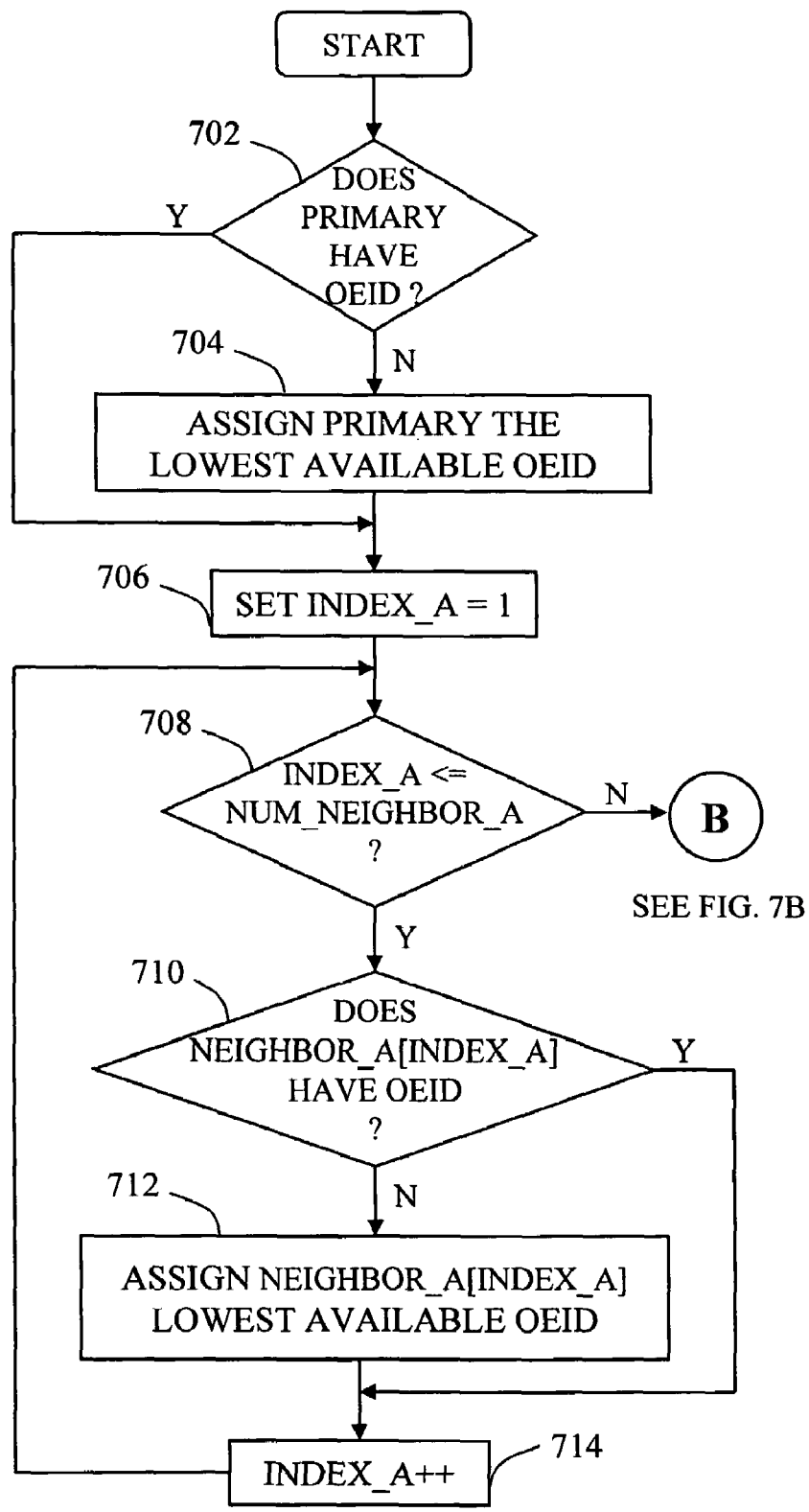
FIGS. 7A and 7B taken together is a flow chart corresponding to the element number assignment state of FIG. 3, in accordance with the preferred embodiment of the present invention.
Figure 7B:
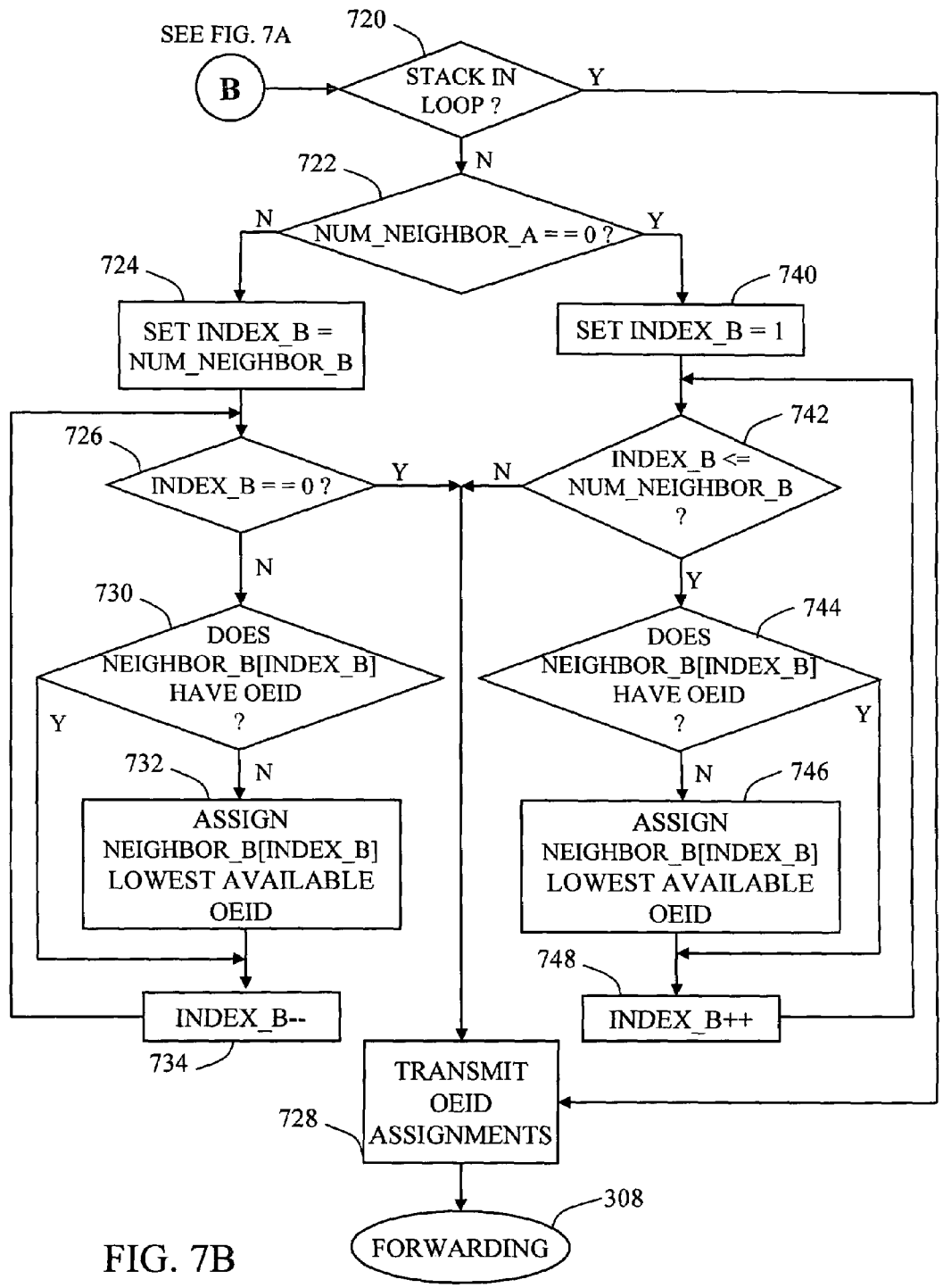

Illustrated in FIGS. 7A and 7B taken together is a flow chart corresponding to the element number assignment state of FIG. 3. Upon entry into the element number assignment state 314, the primary stack switch of the ISS 120 determines OEIDs for those elements that do not already have a unique slot number or have an unspecified slot number such as a manufacturer-defined default value, for example. As stated above, the OEIDs are used to address PDUs and control messages between the stack switches. Where possible, the primary master preferably attempts to assign OEIDs to consecutive switches in sequential order beginning at one or the lowest available integer value.

As indicated by the primary stack switch (PSS) OEID test 702, the PSS evaluates its own operational element identifier and, if necessary, assigns (step 704) itself the lowest available OEID. For the convenience of the network administrator, the primary master is preferably assigned an element identifier of one (1) which would be available if not previously assigned to another element. The primary master proceeds to sequentially walk through each stack switch listed in each of the neighbor tables 218 associated with the two stack ports 202S using an INDEX_A associated with neighbor table of the first stack port, and an INDEX_B associated with neighbor table of the second stack port. As illustrated, the INDEX_A is initialized (step 706) to a value of one corresponding to the first element listed in the first neighbor list and INDEX_A incremented (step 714) thereafter. If there are one or more neighboring stack switches listed in the first neighbor list, the neighbor_A test 708 is answered in the affirmative and each neighbor with an unspecified OEID (710) is assigned (step 712) an OEID beginning with the lowest available element number. An element generally will not possess an OEID when it is booted-up for the first time or its configuration information is cleared. An element generally will possess an OEID if the element was previously booted-up and allocated an OEID, which would be retained in persistent memory as the SEID. Each of the port_A neighbor stack switches, i.e., the total number given by num_neighbor_A, is assigned an OEID as needed at which point INDEX_A is greater than num_neighbor_A and neighbor_A test 708 is answered in the negative. If the ISS 120 is characterized by a loop topology, for example, each stack switch is accessible from the first stack port and therefore assigned an OEID under the procedure outlined in FIG. 7A. In such a case, the loop test 720 of FIG. 7B is answered in the affirmative and the assigned OEIDs are transmitted to each of the applicable elements.

Referring to FIG. 7B, upon completion of the OEID assignment procedure for elements accessible from the first stack port, the primary master assigns OEID to elements accessible from the second stack port. In the preferred embodiment, the sequential order in which assignments are made is dependent on the topology of the ISS 120 and the number of elements accessible from each stack port. If the ISS 120 topology is characterized by a chain and there are elements from both stack ports 202S, OEIDs are assigned to elements off the second stack port in ascending order beginning with the most remote element. This OEID assignment scheme therefore assigns OEIDs to elements in a chain as if the elements were connected in a ring, thus providing an intuitive numbering scheme for the ease of use and convenience of the network administrator. In particular, if there are elements reachable through the first stack port—that is, the num_neighbor_A test 722 is negative—the most remote neighbor stack switch off port_B—given by INDEX_B=NUM_NEIGHBOR_B in the neighbor table—is assigned (step 732) the lowest available element number, if the element has not already been assigned (test 730) an OEID. As indicated by the decrementing step 734, the INDEX_B is reduced and the OEID is assigned, as needed, to the next closest until the adjacent stack switch off the second stack port has been processed. After each of the elements is assigned an OEID, the INDEX_B test 726 is answered in the affirmative, the element identifiers are transmitted (step 728) to their respective stack switches in the form of OEID assignment messages, and the primary proceeds to the forwarding state 308.

In contrast to the above, where there are no neighboring stack switches accessible from the first stack port—that is, num_neighbor_A equal to zero and test 722 is affirmative—OEID assignments are generally made from the lowest available OEID starting with the adjacent neighbor given by the first listed element in the neighbor_B table. In particular, stack switch recited in the neighbor_B table at a position given by INDEX_B—that is, neighbor_B[INDEX_B]—is assigned (step 746) the lowest available OEID until each element that requires (step 744) an OEID is assigned an OEID and the complete neighbor_B table has been traversed, which occurs when the INDEX_B is greater than the num_neighbor_B and the neighbor testing step 742 is answered in the negative.

Figure 8A:
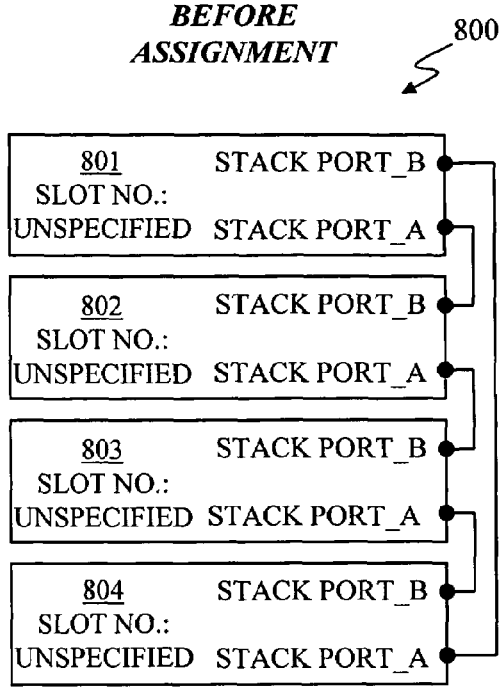
FIGS. 8A and 8B taken together is an example ISS system before and after the assignment of element numbers, respectively, in accordance with the preferred embodiment of the present invention.
Figure 8B:
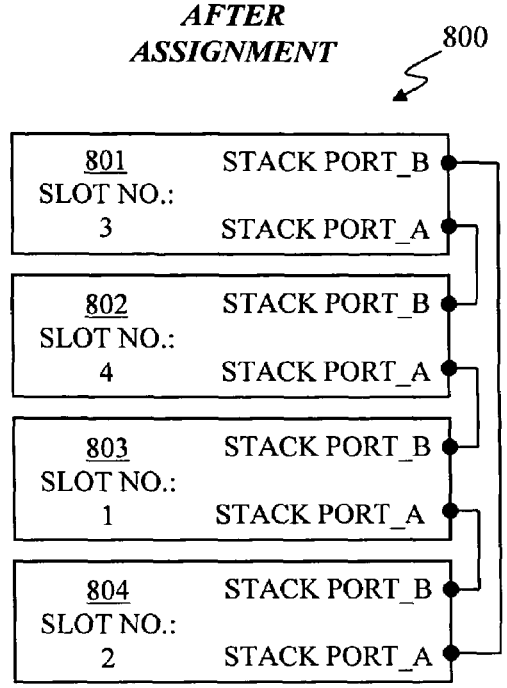

Illustrations in FIGS. 8A and 8B provide examples of the ISS system 800 before the assignment of element numbers to the left and after the assignment of element numbers to the right, respectively. In these examples, the ISS 800 includes four stack switches 801-804 operably coupled in the form of a loop or a ring. Prior to the element number assignment state 314, each of the elements has an unspecified OEID and the third switch 803 has assumed the role of the primary master. In accordance with the present invention, the third switch 803 assigns itself the lowest available OEID, i.e., one (1) and assigns the elements accessible from the first stack port, i.e., port_A, in sequentially increasing order. As illustrated in FIG. 8B, the stack switch 804 adjacent to port_A of the PSS 803 is assigned an OEID of two (2), the next most stack switch 801 is assigned an OEID of three (3), and the most remote stack switch 802 from port_A of the primary master 803 is assigned an OEID of four (4). Upon receipt of a message from the primary master advertising the OEIDs of all elements, each of the stack switches 801-804 stores its own new OEID assignment in volatile memory, sets its own SEID to be equal to its new OEID and saves its own SEID to persistent memory. The message from the primary master advertising the OEIDs also includes the MAC address associated with each of the OEIDs.

Figure 9A:
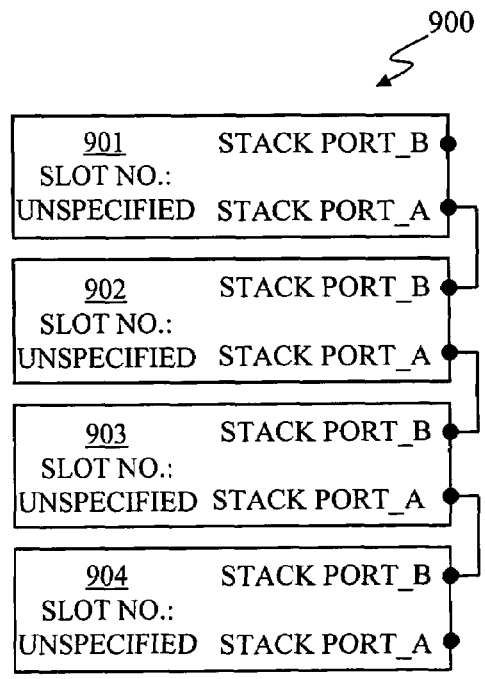
FIGS. 9A and 9B taken together is an example ISS system before and after the assignment of element numbers, respectively, in accordance with the preferred embodiment of the present invention.
Figure 9B:
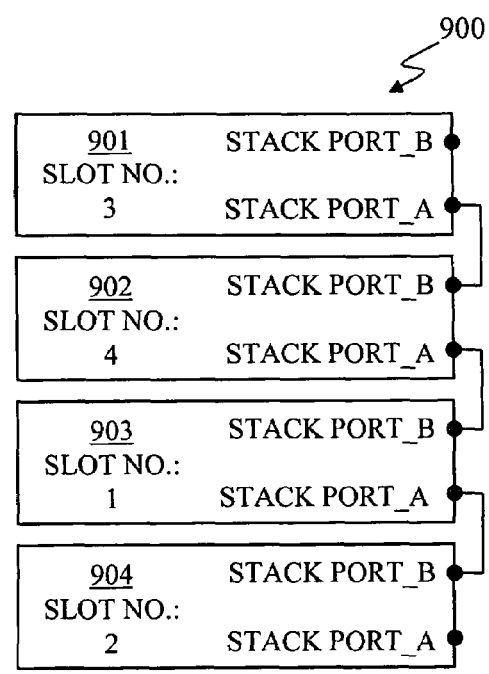

Illustrations in FIGS. 9A and 9B provide examples of the ISS system 900 before the assignment of element numbers to the left and after the assignment of element numbers to the right, respectively. In these examples, the ISS 900 includes four stack switches 901-904 operably coupled in the form of a chain. Prior to the element number assignment state 314, each of the elements has an unspecified OEID and the third switch 903 has assumed the role of the primary master. In accordance with the present invention, the third switch 903 assigns itself the lowest available OEID, i.e., one (1) and assigns the elements accessible from the first stack port, i.e., port_A, in sequentially increasing order. As illustrated in FIG. 9B, the stack switch 904 adjacent to port_A of the primary master 903 is assigned an OEID of two (2). Due to the presence of one or more stack switches adjacent to stack port_A of the primary master 903, the primary assigns OEID in ascending order starting with the most remote stack switch off port_B. In particular, the primary master 903 assigns the next lowest available element number, i.e., an OEID of three (3), to the remote stack switch 901 while the next stack switch 902 in the direction of the primary is assigned an OEID of four (4). As a result, the automatic assignment of the element numbers by the PSS 903 results in a sequentially ascending sequence of element numbers consistent as if the chain of stack switches were a ring, thus providing the network administrator a convenience and intuitive numbering convention automatically.

Figure 10A:
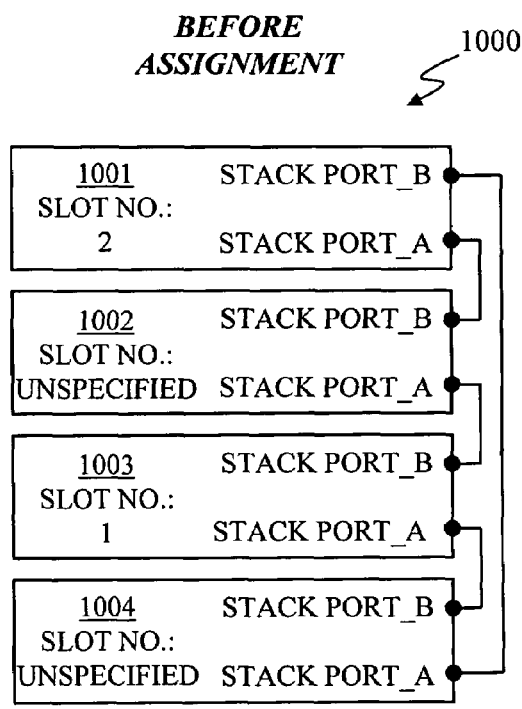
FIGS. 10A and 10B taken together is an example ISS system before and after the assignment of element numbers, respectively, in accordance with the preferred embodiment of the present invention.
Figure 10B:
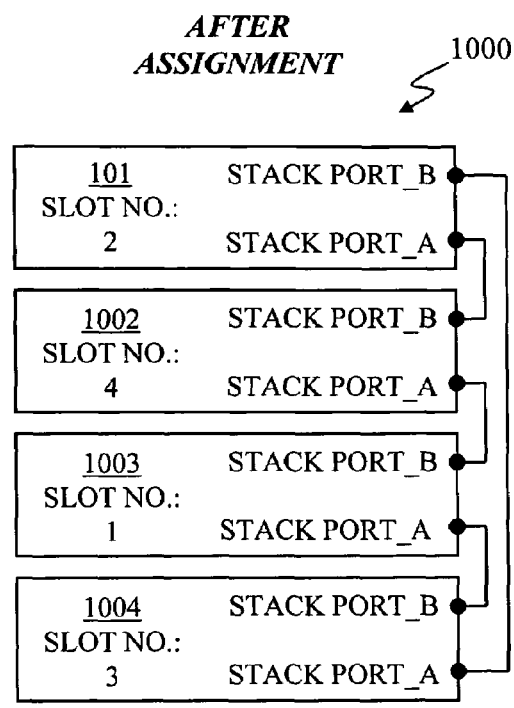

Illustrations in FIGS. 10A and 10B provide examples of the ISS system 1000 before the assignment of element numbers and after the assignment of element numbers, respectively. In this example, the ISS 1000 includes four stack switches 1001-1004 operably coupled in the form of a ring. Prior to the element number assignment state 314, some but not all of the elements have previously-assigned element numbers, i.e., the first element has an OEID of two (2) and the third element has an OEID of one (1). As before, the third switch 1003 has assumed the role of the primary master. In accordance with the present invention, the stack switch 1004 adjacent to port_A of the primary master 1003 is assigned the lowest available element number, i.e., an OEID of three (3). Continuing to the next stack switches reachable through port_A of the primary master 1003, the primary master assigns available OEIDs in ascending order. In particular, the primary master 1003 assigns the next lowest available element number of four (4) to the stack switch 1002.

E. Forwarding State

Referring to FIG. 3 again, after the element number assignment state 314, the stack switches of the ISS are adapted to transition into the forwarding state 308 in which each of the switches 100-103 is adapted to transmit data traffic to each of the other switches. In the preferred embodiment, the communications between stack switches may employ an inter-switch label used to efficiently forward PDUs through the ISS 120 without each receiving element executing an independent classification and forwarding operations, which are resource intensive and sometimes unnecessary given the stack switches are serially coupled to each other. The inter-switch label employed in the preferred embodiment includes a protocol identifier, the OEID of the source element, and the OEID of the destination element, which are pre-pended to the PDU transmitted through the ISS. Upon receipt of the PDU by a stack switch between the source and destinations elements, the intermediate element inspects the label for the protocol identifier, determines that itself is not the destination element, and forwards the PDU to the opposite stack port on which it was received. Upon receipt at the destination element, the label is removed from the PDU, and the PDU is forwarded to a data port 202 towards the ultimate destination node specified in the PDU.

F. Pass-through State

As illustrated in FIG. 3, one or more stack switches of the preferred embodiment are adapted to transition into a pass-through state 320 from one or more other states including the forwarding state 308. The pass-through (PT) state 320 provides a mechanism to prevent the disruption of data traffic across the ISS 120 when the switching capability of an element is disabled, while still allowing the network administrator to monitor and issue configuration commands to the disabled element. In particular, an element that is barred from executing switching and routing operations, for example, transitions to the pass-through state 320 in which traffic received on one stack port 202S is forwarded to the opposite stack port. The data ports 202, in contrast, are in a blocking mode in which traffic transmission and reception are disabled. As one skilled in the art will appreciate, the PT state 320 maintains the transmission continuity across the ISS even if a particular element is incapable of performing layer 2 switching and layer 3 routing.

In the preferred embodiment, an element enters the PT state 320 under one or more of the following conditions: insufficient switching controller identifiers (SCIDs); too many elements in the stack; duplicate OEIDs, i.e., that same OIED being used by two or more elements; and user request via management command. In the preferred embodiment, the primary master is prohibited from operating in PT state 320. Only elements whose role is secondary, idle or unassigned can operate in this state. Elements in PT state 320 may be permitted to assume the role of secondary or idle without reboot.

In the preferred embodiment, elements in the PT state 320 are uniquely identified by a special range of pass-through element identifiers (PTIDs). A PTID is comparable to the OEID with the exception that the PTID is a runtime value used to identify an element in pass-through to all software applications across the stack, while the OEID is the principal element identifier employed in all other states including the forwarding state 308, for example. Preferably, the range of PTIDs is coextensive with the range of OEIDs with a numerical offset. If, for example, the number of elements varies between 1 and 100, the PTIDs may range form 101 to 200, i.e., the maximum number of elements plus 100. The PTID is assigned by the primary master using a pass-through assignment message including a listing of one or more elements— identified by MAC address and OEID—that are to enter PT state 320 as well as reason for the change.

Prior to entering the PT state 320, the stack manager 214 of the switch going to pass-through mode must notify the interested software applications of the state change, notify the applications that the element is no longer operational as a standard stack element, and permit the switch to disable all the network user ports 202. In addition, the stack manager 214 also notifies all the elements in the ISS 120 that the switch is transitioning to the PT state 320, and provides the reason it is entering this state, along with the switch's original OEID. Preferably, an element generates the appropriate logs and management traps to alert the network administrator of the event.

When an element transitions to PT state 320, a PTID is allocated by the primary master, the PTID is transmitted to the element, and the PTID is used in any messages exchanges instead of the previous OEID. Elements in PT state 320 generally only communicate with management applications via stack manager protocol transport.

From a topological point of view, an element in the PT state 320 is treated as a hop for purposes of determining hop counts. For example, a sequence of stack switches given by 1-101-4-5-6 where the element associated with 101 is in pass-through, element 4 is two hops away from element 1. Therefore, the stack manager 214 of an element in pass-through is charged with decrementing the hop count field of the received message prior to transmission. In variations of the internal propagation mechanism, where the hop count field is not used, the element always forwards received messages out of the opposite stack port 202S.

An element in the pass-through state 320 is adapted to communicate data traffic between stack ports and to receive ISS management messages directed to the PTID by the primary master. In the preferred embodiment, the pass-through elements receive and process the following received stack protocol messages: supervision messages, topology request, topology indication messages, election indication messages, SCID identifier assignment and reload request, i.e., a request to reboot an element. Pass-through elements are also preferably adapted to generate and transmit the following stack protocol messages: supervision messages, topology request messages, and topology indication messages. An element in pass-through does not typically participate on the election process as a candidate. However, it preferably has or has access to the identity of the primary and secondary master elements. It also preferably participates in the process of identifying duplicate masters, duplicate OEIDs and even duplicate PTIDs, which can occur where two stacks are merged and each stack has a PT element with the same PTID.

The following paragraphs summarize how an element reaches the pass-through operation mode in response to scenarios where there are over consumption of SCIDs, where there are more stack switches than the ISS can support, where there are duplicate OEIDs, and where the user indirectly requests the pass-through state via management command. The numbering in the summary paragraphs is done to clarify each example and does not reflect the sole ordinal ranking of the exemplary steps.

Over Consumption of SCIDs:

1. The decision to put an element into the PT state 320 is made by the primary master. The primary distributes a pass-through assignment message with the list of elements instructed to enter the PT state and the reason for each element. A PTID is allocated for each element that needs to go to the PT state 320.

2. Upon reception of a PT assignment message, an element checks if it has been instructed to transition to pass-through. If so, then the element changes its OEID to the PTID specified in the message and notes the reason for going into pass-through mode. The element then:

3. Clears a flag bit associated with the SCID request message to stop requesting a SCID;

4. Updates its role to pass-through;

5. Notifies the interested applications; and

6. Programs the switch fabric (not shown) of its network processor 206 so that conventional user traffic received from stack port_A goes out of stack port_B and the vise versa.

Too many Elements in the Stack:

1. The decision to put an element into the PT state 320 is made by the primary master. The primary distributes a pass-through assignment message with the list of elements instructed to enter the PT state and the reason for each element. A PTID is allocated for each element that needs to go to the PT state 320.

2. Upon reception of a PT assignment message, an element checks if it has been instructed to transition to pass-through. If so, then the element changes its OEID to the PTID specified in the message and notes the reason for going into pass-through mode. The element then:

3. Updates its role to pass-through;

4. Notifies the interested applications; and

5. Programs the switch fabric (not shown) of its network processor 206 so that conventional user traffic received from stack port_A goes out of stack port_B and the vise versa.

Duplicate OEIDs:

1. The decision to go into the PT state 320 is first initiated by the local stack element. When an element learns that there is another stack element with the same OEID, it compares its election key with the election key of the remote duplicate element. If its election key is of lower priority than the election key of the other element, then the local element relinquishes the OEID.

2. The element changes its OEID to a dedicated (special) value to what is referred to herein as a stack duplicate element identifier, e.g., the value 254, which is a temporary ID used until the PTID is received.

3. When the primary master detects that there is an element with a PTID equal to stack duplicate element identifier via a topology or supervision message, for example, it allocates a unique PTID to that element and distributes the new PTID to the element via a PT assignment message with the field reason set to indicate the duplicate OEID. A new PTID is allocated for each element that needs to go to pass-through mode.

4. Upon reception of a pass-through assignment message, an element checks if it has been instructed to transition to PT state 320. If so, the element changes its OEID to the PTID specified in the message and notes the reason for going into pass-through mode. The element then:

5. Updates its role to pass-through;

6. Notifies the interested applications; and

7. Programs the switch fabric (not shown) of its network processor 206 so that conventional user traffic received from stack port_A goes out of stack port_B and the vise versa.

Upon User Request via Management Command:

In some cases, the PT state 320 may be useful even when no conflict or resource starvation situation arises. Embodiments of the present invention provide a management command that can be used by the network administrator to "clear" the SEID, i.e., the element number saved in persistent memory. Although it is not necessary to use the PT state 320 to update the saved element identifier, placing an element in pass-through may be used to facilitate stack renumbering when the number of elements has reached the maximum. For example, assume that the maximum number of stack elements is 4, the range of allowed OEID is [1 . . . 4], and elements are initially configured in a ring given by 1-4-3-2, and the elements are to be renumbered so that the final configuration is given by: 1-2-3-4.

If the implementation requires reboot for the new element identifier saved to persistent memory to become the operational element identifier, then typically the only way to achieve this without splitting the stack is preferably by rebooting the entire stack. The following procedure may be used:

a) stack clear OEID=2 to pass-through, thus result in the operational topology: OEID given by: 1-4-3-101, and SEID given by: 1-4-3-0;

b) stack set the SEID=2 for the element with OEID=4: OEID given by: 1 -4-3-101, and SEID given by: 1-2-3-0;

c) reload element OEID=4 so that after reboot, the OEID is given by: 1-2-3-101, and SEID given by: 1-2-3-0);

d) reload element PTID=101 so that after reboot, the OEID is given by: 1-2-3-4, and SEID given by: 1-2-3-4;

In this manner, only the elements that need to be renumbered are actually rebooted.

The sequence of events resulting from a user-requested transition to the pass-through state is as follows:

1. The decision to go into pass-through mode is first initiated by the primary master. The primary distributes a pass-through assignment message with the list of elements instructed to transition to the pass-through state with the field reason set to a management clear slot. A PTID is allocated for each element instructed to transition to the PT state.

2. Upon reception of a pass-through assignment message, an element checks whether it is has been instructed to transition to the pass-through state 320. If so, the element changes its OEID to the PTID specified in the message and notes the reason for going into pass-through mode. The element then:

3. Clears the SEID from the persistent memory;

4. Updates its role to pass-through;

5. Notifies the interested applications; and

6. Programs the switch fabric (not shown) of its network processor 206 so that conventional user traffic received from stack port_A goes out of stack port_B and the vise versa.

G. Supervision State

Referring to FIG. 3 again, all stack switches of the preferred embodiment are adapted to generate periodic supervision messages and transmit them to their adjacent neighbors. This way, each stack switch is able to monitor for changes in the topology of the network. In particular, the exchange of supervision messages enables an element to: detect when an adjacent neighbor is inserted in the stack, detect when the physical connection toward an adjacent neighbor is modified, detect whether communication with a neighbor is lost even if the physical link between them remains operational. In the preferred embodiment, each stack switch of the ISS 120 periodically transitions into the supervision state 316 from one or more other states including the discovery state 310, the election state 312, the element number assignment state 314, the forwarding state 308, and the pass-through state 320. One skilled in the art will appreciate, however, that topology supervision state 316 and forwarding state 308 may be operated concurrently and therefore integrated into a single state.

Illustrated in FIG. 12 is the content of a stack supervision message in accordance with the preferred embodiment. The supervision message includes a message type 1202 that identifies the message as a supervision message specifically; an originator information field 1204 including the OEID, MAC address, originate stack port, and element hardware type of the sending element; a primary identification key field 1206 including the OEID and MAC address of the primary master recognized by the sending element; a secondary identification key field 1208 including the OEID and MAC address of the secondary master recognized by the sending element; an alone flag field 1210 which, when set, indicates that the sending element does not have an adjacent stack switch on the opposite stack port; and a SCID request matrix field 1212 that provides a list of stack elements whose processor IDs, e.g., switch controller IDs, are unknown or unassigned.

Supervision messages are transmitted from the stack ports 202S in accordance with the supervision timer initialized 501 upon entry into the discovery state 310. In the preferred embodiment, supervision messages are periodically transmitted every second of time although this may be altered depending on the topology, for example. As described in more detail below, supervision message exchanges may be used, for example: (1) as a keep-alive mechanism; (2) to detect in the ISS 120 (a) topology changes, (b) elements with duplicate OEIDs, (c) duplicate primary or secondary master in the ISS; (3) to invoke processes to verify the integrity of the stack; and, (4) if necessary, to initiate actions to correct and update stack topology and stack element information.

In the preferred embodiment, a stack switch 200 is adapted to monitor the stacking link status to determine when the physical stack link to a neighbor becomes operational or non-operational. When a stack link becomes operational, the element sends a topology request message to the newly detected neighbor. When a stack link goes down, the element proceeds to: (a) reset the neighbor list corresponding to the stack link that went down; (b) send a topology indication message out of the opposite stack port to propagate the topology change to the other neighbors; (c) process role changes including selecting a new secondary master, taking over the primary master role if the known primary has failed, requesting the primary master role if there is no longer a primary or secondary present on the ISS 120.

As stated, supervision messages are periodically sent by each stack element to both of its adjacent neighbors. This exchange enables each stack switch to promptly: (a) detect when an adjacent neighbor is inserted in the ISS 120; (b) detect when a physical connection with an adjacent neighbor is modified, e.g. when a stack link cable is exchanged; (c) confirm that an existing neighbor is still alive; and (d) detect—based on the absence of one or more consecutive supervision messages are expected but not received from a neighbor—when communication with a neighbor is lost even if the physical link between them remains operational. If one or more consecutive supervision messages are not received, then the stack switch 200 assumes that the neighbor is no longer operational and invokes the role change processing in order to select a new secondary master in case the known secondary has failed, takes over the primary master role in case the known primary has failed, or requests the primary master role if there is no primary or secondary present on the stack anymore, for example.

The actions taken by the stack switch 200 depend on the specific type of topology change. If a supervision message is received and any ISS topology change detected, the stack switch 200 generates a topology indication message that is then transmitted to the opposite stack link. If a supervision message is received and a new neighbor is detected, the stack switch 200 sends to the new neighbor the known ISS topology with respect to the opposite stack link, i.e., the stack switch neighbors recited in the neighbor list associated with the opposite stack port. If a supervision message with a flag alone set is received, the stack switch 200 updates the associated neighbor list by removing any neighbor(s) that are reachable through the element sending the supervision message. If a supervision message with a flag alone not set is received and the neighbor list associated with the stack port indicates the presence of a single neighbor, the stack switch 200 transmits a topology request message to the originator of the supervision message. If a supervision message is received and the stack link cabling is changed, the stack switch 200 resets or otherwise clears the neighbor list associated with the stack link from which the message was received and sends the already known topology to this neighbor via a topology indication. After the appropriate response is executed, the stack switch 200 transitions back to a state that preceded the supervision state 316.

As one of ordinary skill in the art will appreciate, the supervision message exchange affords many benefits. In particular, neighbor failures are detected promptly due to the neighbor monitoring feature and the fast takeover results from processing role changes immediately when a stack link goes down, or an adjacent neighbor has not responded to a number a consecutive supervision messages. In addition, a stack switch in some embodiments may temporarily disable the supervision state 316, i.e., prevent the transmission of supervision messages, for example. The primary master may distribute a supervision suspension message to all stack elements where, for example, an error has occurred and the primary master is preparing a postmortem file in anticipation of a shut-down and re-boot. In response to the supervision suspension, the elements of the ISS 120 withhold supervision messages which, if not responded to, would lead the stack switches to erroneously assume the primary master is lost and revert to the secondary master, thus giving rise to two primary masters when the original primary master finishes preparing the postmortem file. The supervision state may be automatically re-enabled by the primary master after it has completed preparation of postmortem file. In some embodiments, the supervision state 316 is re-enabled automatically by the element itself after a predetermined period of time defined by a timeout parameter in order to cope with situations in which the supervision state is not re-enabled by the primary master. The timeout parameter ought to be long enough for the primary master to complete the preparation of the postmortem file.

In some embodiments, an element also checks its local matrix of SCID upon receipt of a supervision message. If an element is requesting SCIDs, the element checks its local copy of local matrix of SCID to see whether it knows the SCID assignment for that particular element. If so, it sends out a SCID assignment message to all stack members by way of internal propagation mechanism. If the recipient of the supervision message does not know the SCID assignments, it sets a flag corresponding to the requesting element in the global SCID matrix and propagates the updated matrix to the opposite neighbor elements.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A switching device in a stack switch system comprising a plurality of stack switches operably coupled in a series, the switching device comprising: two stack ports, at least one of the stack ports operably coupled to one of the plurality of stack switches; and a stack manager configured to: identify one or more of the plurality of stack switches without an operational stack switch identifier; and automatically assign each of said one or more stack switches one of a set of operational stack switch identifiers based on a time each of said one or more stack switches became operational, wherein said stack manager listens on said stack ports for co-related keep-alive messages that employ message sequence numbers to establish a relationship with the preceding keep-alive message sent to determine each said stack switches become operational; wherein the set of operational stack switch identifiers comprise sequential integers, and wherein the sequential operational stack switch identifiers are assigned in accordance with a sequential position of said one or more stack switches in the series.

2. The switching device of claim 1, wherein the lowest integer of the set of operational stack switch identifiers is assigned to a stack having the lowest MAC address in the stack switch system.

3. The switching device of claim 1, wherein the set of operational stack switch identifiers comprised consecutive integers.

4. The switching device of claim 3, wherein the set of consecutive integers are assigned in ascending order.

5. The switching device of claim 4, wherein a first integer of the set of consecutive integers has a value of one.

6. The switching device of claim 3. wherein the first integer of the set of consecutive integers is assigned to stack switch having the lowest MAC address in the stack switch system.

7. The switching device of claim 2, wherein the set of operational stack switch identifiers are unique element identifiers within the stack switch system.

8. The switching device of claim 4, wherein the set of consecutive integers are assigned to stack reachable from a first stack port of the plurality of stack ports.

9. The switching device of claim 8, wherein the stack switch system possesses a ring topology.

10. The switching device of claim 8, wherein stack switch system possesses a chain topology 11. The switching device of claim 1, wherein the set of sequential integers are assigned to stack switches reachable from a first stack port of the plurality of stack ports and a second stack port of the plurality of stack ports, wherein the sequential integers are assigned in accordance with a sequential position of said one of more stack switches in the series starting with an extreme end of the chain.

* * * * *